(12) United States Patent
Lee et al.

(10) Patent No.: US 7,882,064 B2
(45) Date of Patent: Feb. 1, 2011

(54) FILE SYSTEM REPLICATION

(75) Inventors: Edward K. Lee, Mountain View, CA (US); Ming Benjamin Zhu, Palo Alto, CA (US); Umesh Maheshwari, San Jose, CA (US); R. Hugo Patterson, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 216 days.

(21) Appl. No.: 11/483,131

(22) Filed: Jul. 6, 2006

(65) Prior Publication Data

US 2008/0010322 A1 Jan. 10, 2008

(51) Int. Cl.
G06F 17/30 (2006.01)

(52) U.S. Cl. ..................................... 707/625

(58) Field of Classification Search .................. 707/201, 707/204, 206, 613, 625, 638
See application file for complete search history.

(56) References Cited

U.S. PATENT DOCUMENTS

| 5,857,207 | A  | * | 1/1999  | Lo et al. ..................... 707/203 |
| 5,978,805 | A  | * | 11/1999 | Carson ........................ 707/10 |
| 6,125,369 | A  | * | 9/2000  | Wu et al. .................... 707/201 |
| 6,145,012 | A  | * | 11/2000 | Small ......................... 709/246 |
| 6,516,314 | B1 | * | 2/2003  | Birkler et al. ............... 707/621 |
| 6,668,264 | B1 |   | 12/2003 | Patterson et al. |
| 6,859,821 | B1 | * | 2/2005  | Ozzie et al. ................ 709/205 |
| 6,915,316 | B1 |   | 7/2005  | Patterson et al. |
| 7,277,901 | B2 | * | 10/2007 | Parker et al. ............... 707/203 |
| 7,698,318 | B2 | * | 4/2010  | Fries et al. ................. 707/610 |
| 7,730,031 | B2 | * | 6/2010  | Forster ....................... 707/625 |
| 2005/0193031 | A1 | * | 9/2005  | Midgley et al. ............. 707/200 |
| 2006/0069719 | A1 | * | 3/2006  | McCanne et al. ........... 709/203 |
| 2006/0136441 | A1 | * | 6/2006  | Fujisaki ...................... 707/101 |
| 2006/0206536 | A1 | * | 9/2006  | Sawdon et al. ............. 707/200 |
| 2006/0235908 | A1 | * | 10/2006 | Armangau et al. .......... 707/204 |

OTHER PUBLICATIONS

U.S. Appl. No. 10/611,237, filed Jun. 2003, Patterson.
Patterson et al. "SnapMirror: File-System-Based Asynchronous Mirroring for Disaster Recovery." Jan. 2002, Proceedings of the Conference on File and Storage Technologies.
Tridgell et al. "The rsync algorithm." TR-CS-96-05, Australian National University, 1996.
DoubleTake replication software: http://www.doubletake.com/. Jul. 2006.
"Using Asynchronous Replication for Business Continuity between Two or More Sites" $EMC^2$. Dec. 2004.

* cited by examiner

*Primary Examiner*—James Trujillo
*Assistant Examiner*—Jorge A Casanova
(74) *Attorney, Agent, or Firm*—Van Pelt, Yi & James LLP

(57) ABSTRACT

File system replication includes determining whether one of a plurality of files included in an original file system has been updated since a previous replication, the file having a plurality of data segments, and in the event that the file has been updated, locating among the plurality of data segments a previously stored data segment that is newly referenced by the file, and that does not require replication.

31 Claims, 6 Drawing Sheets

FILE SYSTEM REPLICATION

BACKGROUND OF THE INVENTION

Data replication is used by data storage systems to synchronize data between an original storage system and a replicated file system. A simple way of data replication is to copy the entire contents of the original storage system to the replicated file system periodically. This method, however, is inefficient because it duplicates all the data without regards to whether the data has been modified. Furthermore, it requires a large amount of bandwidth between the original and the replica. An alternative method is to reproduce the same operations on both the original and the replica. For example, when a file is created on the original, the same action is repeated on the replica and an identical duplicate file is created on the replica. As the file is modified, data about the changes is sent to the replica and the duplicate file is updated accordingly using the data received. This method requires a significant amount of bandwidth between the original and the replica, as well as a reliable connection between the two to keep the storage systems synchronized.

Some existing systems improve the operation reproduction method by using log records. Operations of the original system and relevant data associated with the operations are recorded, and sent to the replica system at a later time. Based on the log record, the replica system executes the same operations to synchronize its file system with the original. For example, when a file is created on the original system, a log entry is created to record information such as the file name, permission levels, etc. As the file is modified, one or more log entries are created to record the modification. At update time, the log entries are sent to the replica system, which carries out the operations of file creation and modification in the same order as the original. Although this method does not require a constant, reliable connection between the original system and the replica system, it still demands significant bandwidth since the logs can grow quite large. It is also inefficient, especially when multiple files share the same data.

Another approach implemented by some existing systems uses file system snapshots. After the initial replication, a snapshot of the original file system is taken. At update time, another snapshot is taken for the original file system. The two snapshots are compared, and only files that are different are updated. For example, new files and modified files on the original are copied to the replica, and deleted files are removed from the replica. Although this approach eliminates the need for logs, its bandwidth requirement can still be large, especially when files are frequently modified.

It would be desirable to have a way of replicating data that does not consume too much network bandwidth. It would also be useful if the replication technique is flexible and efficient in selecting the data to be replicated.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

File system replication is described. As used herein, a file system refers to a collection of files stored on a computer system. It may include an entire traditional file system used by computer systems to organize and manipulate files, one or more directories or sub-directories in a traditional file system, as well as any other appropriate organization of files. In some embodiments, one or more files in an original file system that have been updated are determined. The updated file includes a plurality of data segments. One or more data segments that have been stored previously on the replicated file system and that do not require replication are located among the plurality of data segments. In some embodiments, metadata changes and data segments that have not been stored previously on the replicated file system are replicated on the replicated file system. Log records, content handles, data segment references, and other appropriate data are used in various embodiments to facilitate the replication process.

Figure 1:
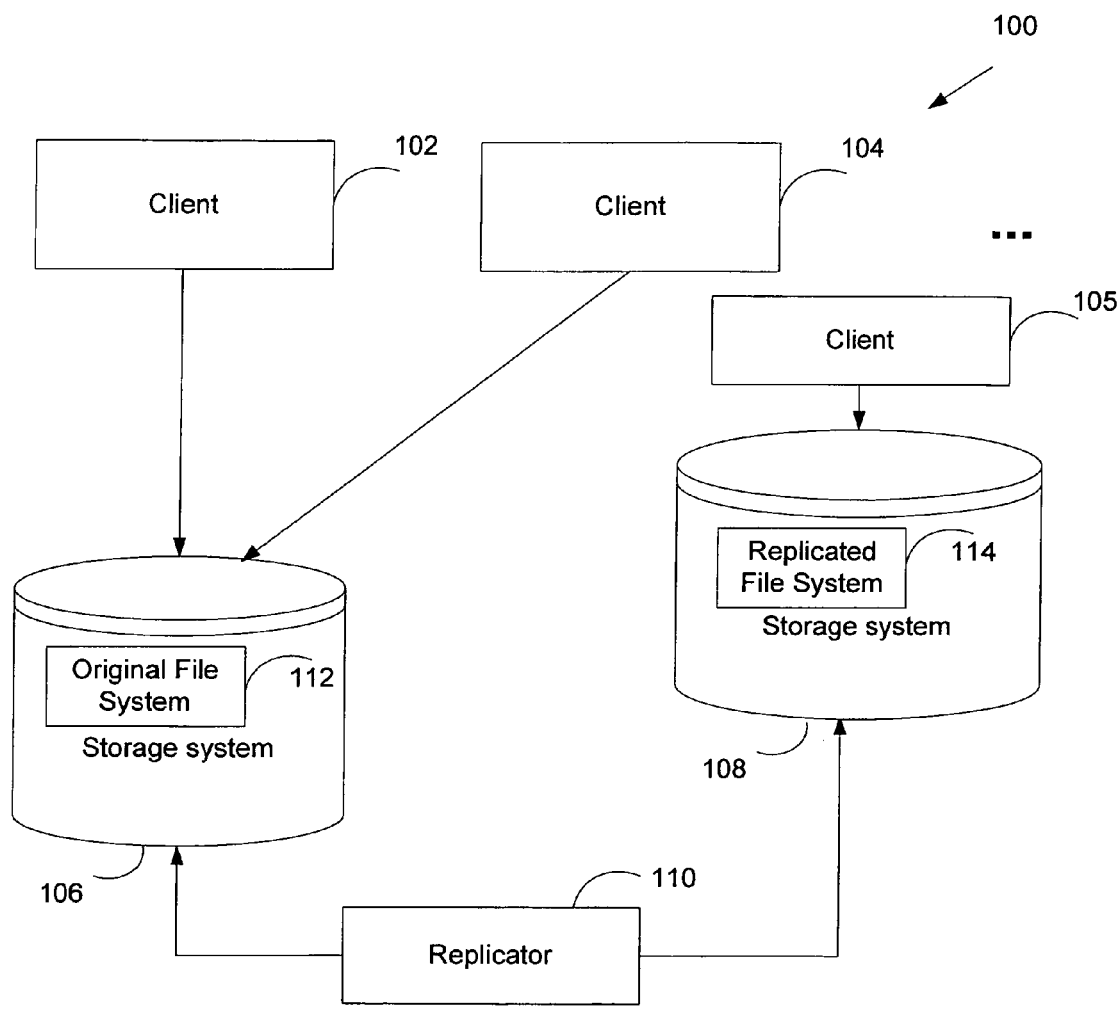
FIG. 1 is a block diagram illustrating an embodiment of a data replication system.

FIG. 1 is a block diagram illustrating an embodiment of a data replication system. In this example, data replication system 100 includes two storage systems 106 and 108. Storage system 106 hosts a writable, original file system 112 (sometimes referred to as the source or production file system). Storage system 108 hosts replicated file system 114 (sometimes also referred to as the destination or backup file system). The original file system is shown to be accessible by clients such as 102 and 104 which can create, delete and modify files in the file system. The configuration of the storage system, original file system and the clients varies in some systems. For example, in some embodiments, the storage system supports a single file system and is dedicated to a single client. In some embodiments, the storage system supports multiple file systems, and each file system may be modified by one or more clients. In some embodiments, a single storage system may host both original and replicated file systems or file systems replicated from other storage systems.

A replicator 110 replicates original file system 112 on replicated file system 114. As shown, the replicated file system can be accessed by both the replicator and clients such as 105. To perform file replication, the replicator may create, delete or modify files on the replicated file system. In some embodiments, clients can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs. In some embodiments, data segments included in the original file system are copied to the replicated file system via removable storage media and initialization is completed via the network. The replicator updates changes to the original file system on the replicated file system, keeping the two file systems synchronized. The replicator may be implemented as a process and/or device separate from the storage systems and/or file systems, a process and/or device that is a part of one or both of the storage systems and/or file system, or any other appropriate means. For example, in some embodiments, the replicator is a standalone device capable of communicating with the file systems. It determines the necessary updates by communicating with the original file system, and sends the updates to the replicated file system. The replicated file system is configured to answer queries, accept the updates, and modify the contents in the file system accordingly. In some embodiments, the replicator's functions are implemented as separate processes on the storage systems. For example, a process residing on the storage system 106 is configured to determine the updates associated with original file system 112 and send them to another process residing on storage system 108. The latter process accepts the changes, processes them, and modifies replicated file system 114. Details of the replicator's operations are discussed further below.

Figure 2A:
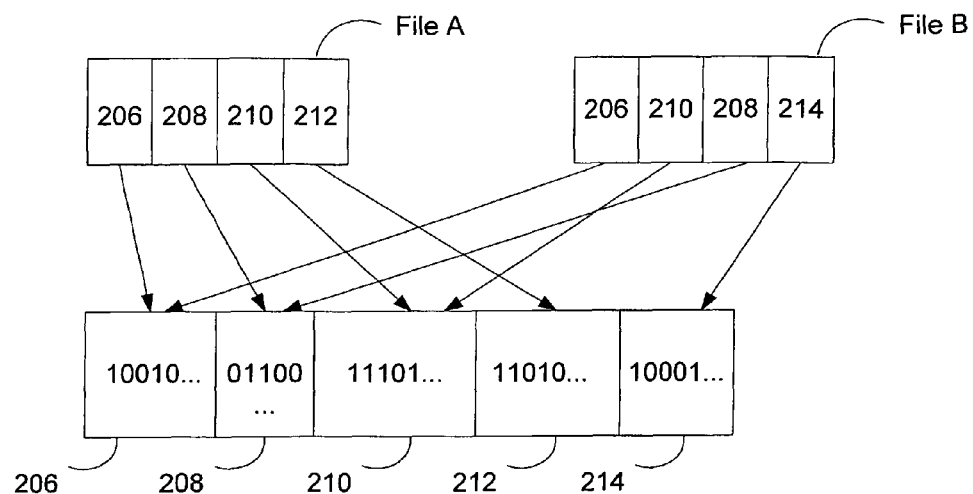
FIGS. 2A-2B are block diagrams illustrating examples of files in an embodiment of a segmented file system.
Figure 2B:
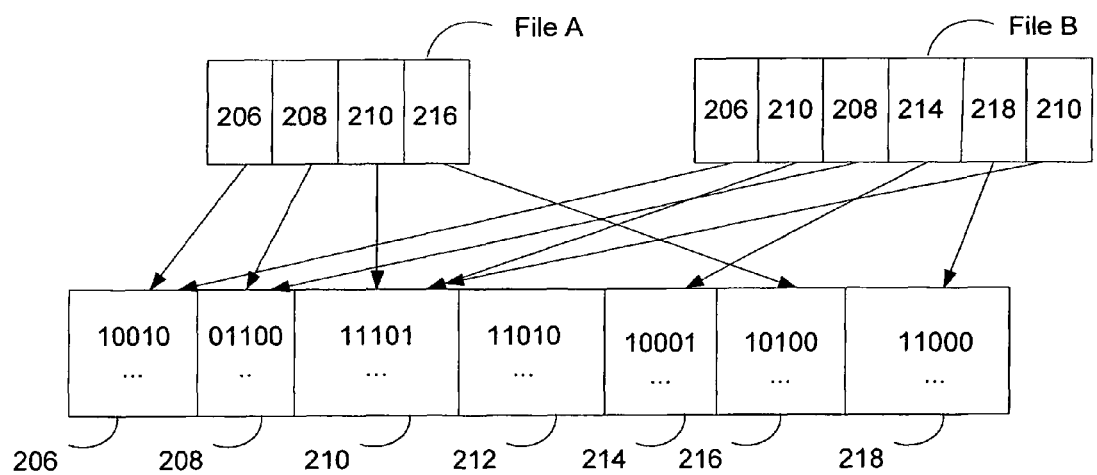

In some embodiments, file system data is divided into segments to eliminate duplicate storage of the same data. FIGS. 2A-2B are block diagrams illustrating examples of files in an embodiment of a segmented file system. In FIG. 2A, the contents of files A and B are decomposed into a number of data segments. The data segments are not necessarily of the same size. Each of the data segments has an identifier. In the example shown, the segment identifiers are serial numbers 206-214. In some embodiments, address locations of the segments, content based identifiers such as fingerprints calculated based on segment data, or other appropriate identifiers are used. Techniques for generating and using the identifiers may be found, for example, in U.S. patent application Ser. No. 10/611,309 entitled DATA STORAGE USING IDENTIFIERS filed Jun. 30, 2003, which is incorporated herein by reference for all purposes.

Contents of files A and B are represented using an ordered collection of segment identifiers (also referred to as segment references). Since the files may share some identical data segments, referencing the segments using identifiers allows a single instance of a particular segment to be stored in the storage system, thus eliminating duplicate data. For example, both files A and B include data contained in segments 206, 208, and 210, all of which are stored only once in the storage system. It is possible to represent files in other ways, such as using a mixture of byte sequences and references to byte sequences in other files. The byte sequences are treated as data segment. The identifiers used to reference the segments are substantially shorter than the segments themselves. Therefore, using identifiers allows more efficient use of available storage space.

In some embodiments, the data segments and data segment identifiers are replicated on the replicated file system. In some embodiments, metadata of files are also updated. As used herein, metadata includes data associated with various attributes of the file, such as file name, file length, date stamp, permission, whether a file has been removed from the current file system, whether a file has been renamed, etc.

FIG. 2B illustrates the contents of files A and B at a later time. In this example, the files have been modified such that file A references segment 216 instead of 212. File B references a new segment 218 in addition to segments 206-214, and has an additional reference to segment 210. According to some embodiments, during an update, only segments 216 and 218 are transferred to the replicated file system. Segments 206-214 and 210 have been stored previously on the replica and therefore are not transferred again. The sequences of references for the files are replicated on the replicated file system.

Figure 3:
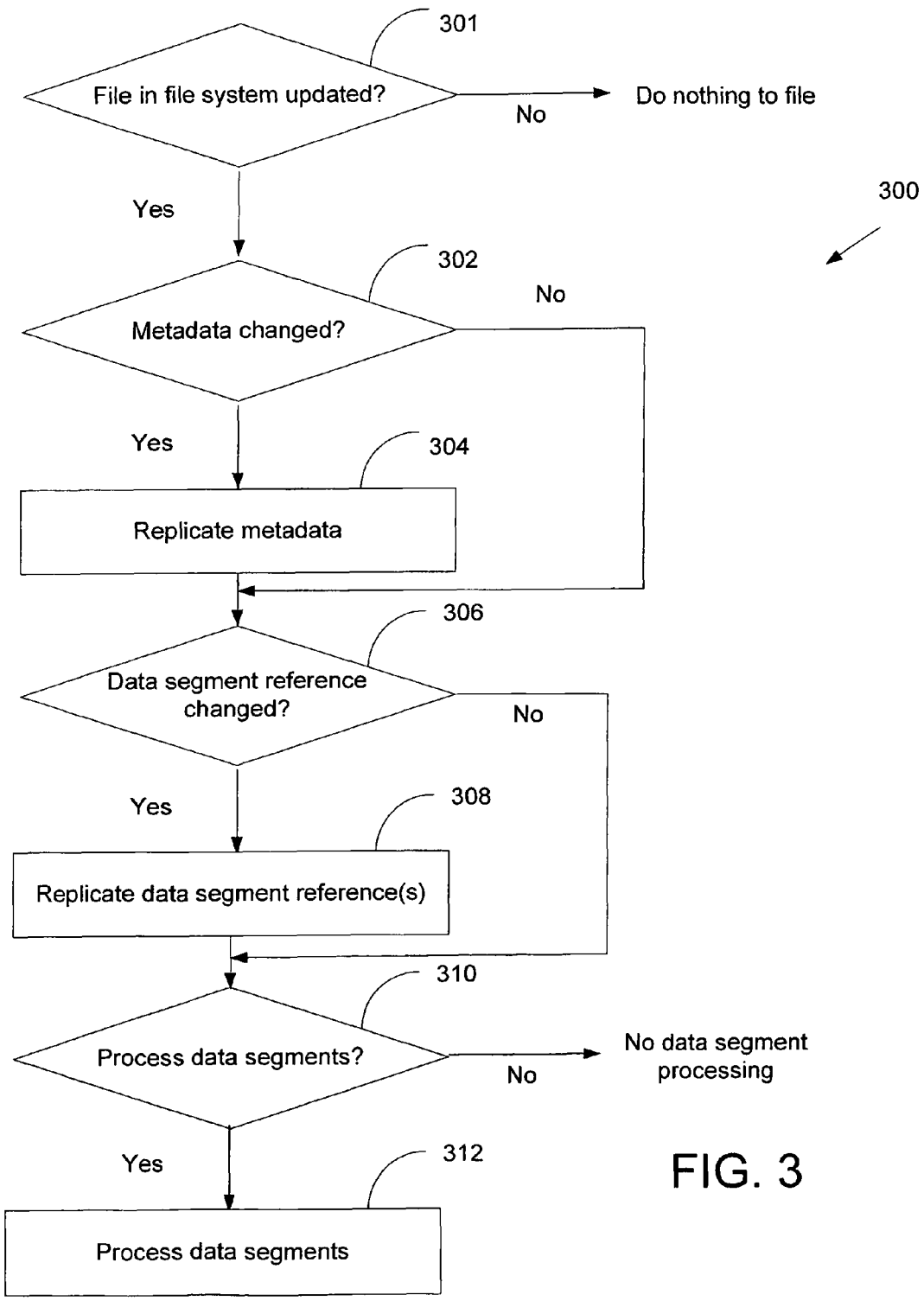
FIG. 3 is a flowchart illustrating an embodiment of a data replication process.

FIG. 3 is a flowchart illustrating an embodiment of a data replication process. Process 300 may be implemented on replicator 110 of system 100. In the example shown, process 300 begins at 301, where it is determined whether a file on the original file system has been updated since the last replication. A file is deemed to have been updated if it has been modified in some way since the last replication, such as having been edited, created, renamed, deleted, had a permission change, etc. If the file has not been updated, nothing needs to be done to it in terms of replication. The file, as previously shown in the example of FIG. 2A, is segmented and is represented using an ordered collection of data segment references. If the file has been updated, it is determined whether the metadata associated with the file has changed (302). If there has been change, the metadata is replicated on the replicated file system. Else, the metadata does not need to be replicated.

Further, it is determined whether any of the data segment references have changed (306). If so, one or more data segment references are replicated (308). In some embodiments, the entire set of data segment references is replicated on the replicated file system if any of them has changed. In some embodiments, the changed data segment references are replicated.

Further, it is determined whether the data segments should be processed (310). In some embodiments, this determination is equivalent to a determination of whether the file's content has changed. In some embodiments, the determination is made based at least in part on the metadata. Some metadata indicates that the data segments do not have to be processed. For example, if the metadata indicates that the file has been deleted, then the data segments do not need to be processed and process 300 completes. If, however, it is determined that the data segments should be processed, the data segments are processed to determine whether any of the data segments should be replicated, and the data segments are replicated as appropriate (312). In this example, data segments that have been previously stored on a replicated file system are located. In particular, any data segment that has been previously stored on the replicated file system, but is newly referenced by the file being processed is located. In some embodiments, a data segment is deemed to be newly referenced if it was not referenced by the file at the time of the last replication, as a data segment that has been added or modified since the last replication. In some embodiments, a data segment is deemed to be newly referenced if it was never referenced by the file during the file's replication history, or was not referenced within some number of replications. A data segment may be previously stored on the replicated file system, but is still newly referenced by the file if the data segment was previously stored on the replicated file system by another file, by a client writing to the replicated file system, or by some other preloading/initialization mechanism. Since the data segments have been previously stored, they do not need to be replicated again on the replicated file system. Thus, greater efficiency in replication is achieved, especially in file systems where multiple files share a large amount of identical data. How to locate these previously stored data segments are discussed in more detail below. Further, data segments that have not been previously stored on the replicated file system are located and replicated on the replicated file system. It is possible in some situations that all the data segments included in the file have been previously stored on the replicated file system therefore no additional replication is necessary. It is also possible that there is no previously stored data segment and all the data segments in the file need to be replicated.

Process 300 may be repeated to process all the files in the original file system. The process may be performed serially or in parallel to process the files.

There are a number of ways to determine whether a file in the original file system has been updated since the last replication (302). Some examples are described below, although any appropriate techniques may be used. For example, in some embodiments, once a file is updated, it is time stamped by the system. At the next replication, a file system walk is performed to traverse the files in the file system and examine the time stamps. Files with time stamps after the last replication are deemed to have been updated. Besides time stamps, other types of markers can be used to identify updated files.

In some embodiments, a system tool such as rsync in Unix systems is used to compare the file systems residing on the original and the replicated file systems, and to determine the files that have been updated.

In some embodiments, a log record is used to track the file system operations, recording file updates as they occur. Depending on implementation, the entries in the log record may include segment references, content handles, metadata, and other information that can be used for executing operations to synchronize the replicated file system with the original file system. There are a number of ways a log entry is generated, including every time an event (such as file write) occurs, after several events occur, or at a predetermined frequency. In some embodiments, to capture more update information with fewer log entries, each log entry is generated only when a key event occurs, such as when a file closes, after a predetermined idle period has lapsed, when a snapshot of the file system is created, etc. During replication, the log record is processed, and updated files are determined based on log entries indicating file update operations such as file modification, file creation, etc.

In some embodiments, a snapshot is taken immediately before a replication starts. The snapshot records information of the file system at a point in time. It may be a snapshot of the entire file system, or a snapshot of one or more individual files. The snapshot may include information such as data segment references, content handles, etc. In some embodiments, prior to the next replication operation, the current states of the system are compared to a snapshot of the system to determine which files have been updated. In some embodiments, the current states of a file are compared to a snapshot of the file to determine whether the file has been updated.

In some embodiments, determining whether a file has been updated since the last replication involves examining the file's content handle. A content handle is a representation of a file's data content at a given point in time. It may include a collection of data segment references, a reference to one or more collections of data segment references, a reference to a reference, etc. It can be viewed as a compact snapshot of a file's data contents. Returning to FIGS. 2A-2B, a file content handle in this example includes an ordered collection of segment references. Here, a segment reference is the same as the segment's identifier, although other forms of references can be used. At the point in time represented in FIG. 2A, a replication had just taken place and the original and the replicated file systems are synchronized. The content handles of files A and B correspond to ordered collections of segment references (206, 208, 210, 212) and (206, 210, 208, 214), respectively. The same content handles, segment references, and segments are stored on the synchronized replicated file system. The content handles at this time are stored. At a later point in time represented in FIG. 2B, files on the original file system have been modified and another replication is ready to proceed. The updated content handles of files A and B correspond to the ordered collections of segment references (206, 208, 210, 216) and (206, 210, 208, 214, 218, 210), respectively. A comparison of the latest content handles and the previously stored content handles indicates that both files A and B have changed.

In processing data segments, there are a number of ways to locate data segments that have not been stored previously on the replicated file system, some of which are described below although any other appropriate technique may be used. In some embodiments, log records are used. Log entries record operations on the original file system. In some embodiments, when a file is updated, a log entry including information about the file's data segment references is created. Offsets of the new data segment references, and other information that may assist in file replication are also recorded as appropriate. During replication, based on the log records of the new data segment references, it is determined whether the data segment being referenced has been stored already.

In some embodiments, upon receiving a query, the data segment reference on the replicated file system is looked up by the replicator or the replicated file system in a database of stored data segment identifiers, to determine whether such a data segment has been stored previously, and provides a response based on the lookup result. In some embodiments, the data segment reference under evaluation is compared with the data segment references known at the time of last replication. The comparison can be carried out by the original file system or by the replicator. If the data segment reference can be found in existing data segment references, it indicates that the corresponding data segment has already been stored. Else, the corresponding data segment may not have been stored and may need to be replicated. In some embodiments, all such segments are replicated. In other embodiments, a query of the replicator or replicated file system determines whether the segment is replicated or not as described above. In all cases, many segments are not replicated even though new references to those segments are. Thus, the available bandwidth of the storage systems and the network connecting them is more efficiently utilized.

In some embodiments, when a file is updated, a log entry including information about the file's content handle is created. In some embodiments, to reduce the amount of processing, a log entry including content handle information is created after multiple updates, or upon certain key event such as when a file is closed. The content handle indirectly references the data segments included in the file and may be analyzed to obtain data segment references. More details of using log records for replication are described below.

In some embodiments, a content handle is used to locate the data segments that have not been stored previously on the replicated file system. Information about the content handle may be recorded in logs, and/or stored as snapshots. Returning again to the example shown in FIGS. 2A-2B. FIG. 2A illustrates data segments of files A and B that are stored on the replicated file system. FIG. 2B illustrates data segments of files A and B on the original file system since the last update. The files shown in FIG. 2B are ready to be replicated on the replicated file system. The content handles for files A and B, in this case ordered collections of data segment references, are examined. File A's content handle includes data segment references 206, 208, 210, and 216. Data segments 206-210 have been previously stored on the replicated file system. The data segments may have been stored previously because of system initialization, previous replication effort, or being copied on the storage system hosting the replicated file system by another client with access, etc. According to examination of data segment references stored on the replicated file system, it is determined that data segment 216 has not been stored previously. As such, only data segment 216 is copied to the replicated file system. Similarly, an examination of File B's content handle indicates that the file includes data segments 206, two instances of 210, 208, and 214, which have been stored previously. The examination and determination can be made by the replicator, the original file system, or the replicated file system. Also included is data segment 218, which is new and should be copied to the replicated file system. After content handle process is completed, the corresponding content handles and the data segment references are also updated on the replicated file system. More details of using content handles for replication are described below.

Different types of content handles are sometimes used in various embodiments. For example, as the files grow large, so do the collections of data segment references associated with the files. To reduce the amount of space taken up by the content handles, in some embodiments, the content handles are derived based on data segment reference collections. Techniques used to generate the content handles are sometimes similar to the ones used to generate the data segment identifiers. For example, in various embodiments, a content handle may include a fingerprint derived from the data segment references that collectively reference the data segments in a file, an address used to store the data segment reference collection, a serial number assigned by the system, and/or any other appropriate value.

Figure 4A:
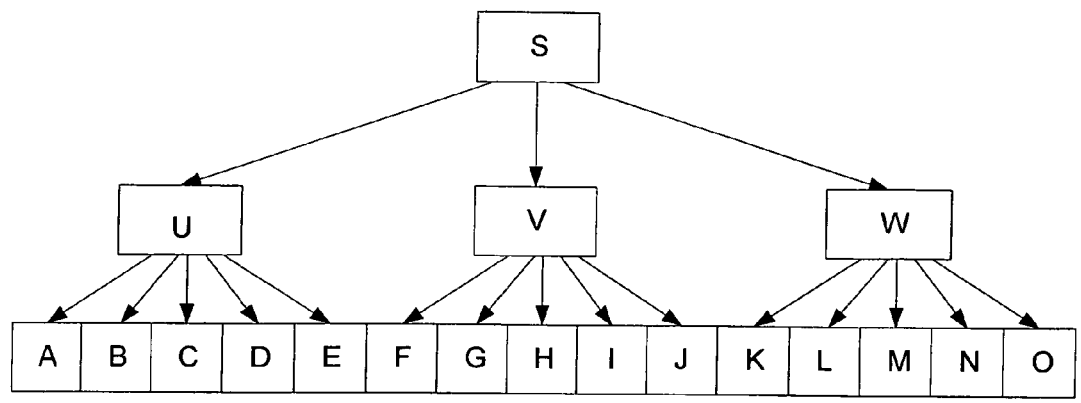
FIGS. 4A-4B are diagrams illustrating examples of multi-layered tree structures used to generate content handles.

In some embodiments, a multi-layered hierarchical data structure is used to generate a content handle. FIG. 4A is a diagram illustrating an example of a multi-layered tree structure used to generate content handles. In this example, the bottom layer represents the data segments. For purposes of illustration, the data segments are labeled with identifiers such as A, B, C, etc., although other alphanumerical forms may be also used. An intermediate layer includes nodes labeled U, V and W, where each node references a plurality of data segments. A reference node in the intermediate layer is generated based on certain criteria. For example, in some embodiments, a reference node is generated for a predetermined number of consecutive data segments. In some embodiments, a reference node is generated for a predetermined amount of data stored in any number of data segments. The top layer node, labeled S, is the content handle. In this example, the content handle is derived based on all the intermediate nodes. The content handle may include a collection of intermediate layer nodes, a fingerprint derived based on the intermediate layer nodes, an address of storage location where the intermediate layer nodes are stored, a serial number, or other appropriate representation. Although a three-layer data structure is illustrated in this example, data structures having more layers are sometimes used in other embodiments. The multi-layered structure allows the content handle to be compact even when the file is large and contains a great number of data segment.

Figure 4B:
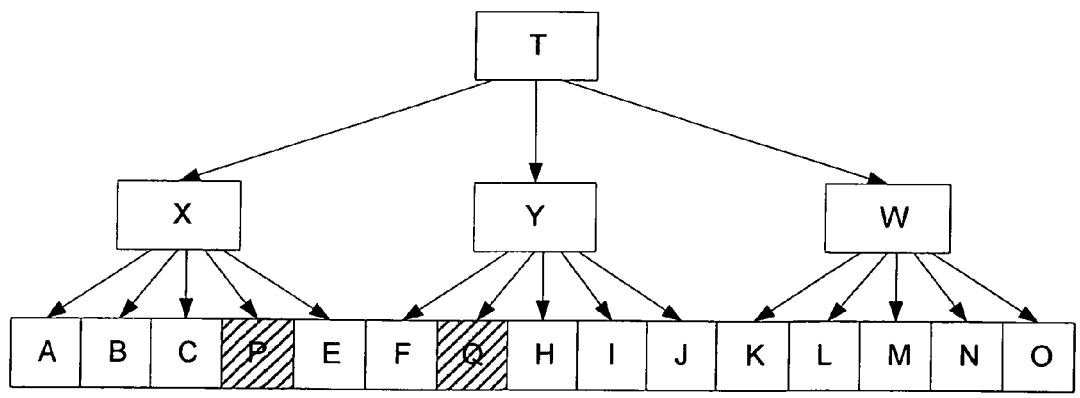

As it is illustrated in FIG. 4B, when the file is updated, one or more of its data segments change. Here, segments D and G have changed and have been replaced with segments P and Q, respectively. As a result, the intermediate references referring to these segments also change. In this case, the intermediate references U and V have changed to X and Y, respectively. W has not changed since none of the data segments it refers to has changed. The changes to the intermediate references propagate to the top layer, and the content handle has changed from S to T. As will be shown in more detail below, the content handle is used in some embodiments to determine changes in the file and/or locate any new data segment.

In some embodiments, updates to the content handle are recorded in a log record to be processed during the next replication. When to update the content handle is implementation dependent. Updating the content handle every time a write operation is performed on a file is permissible but not necessary. In some embodiments, a file's content handle is updated at appropriate times to improve efficiency, such as when the file is closed, after a predetermined idle period has lapsed, when a snapshot of the file system is created, etc. The log entry that includes information about the updated content handle is entered into the log record.

Figure 5:
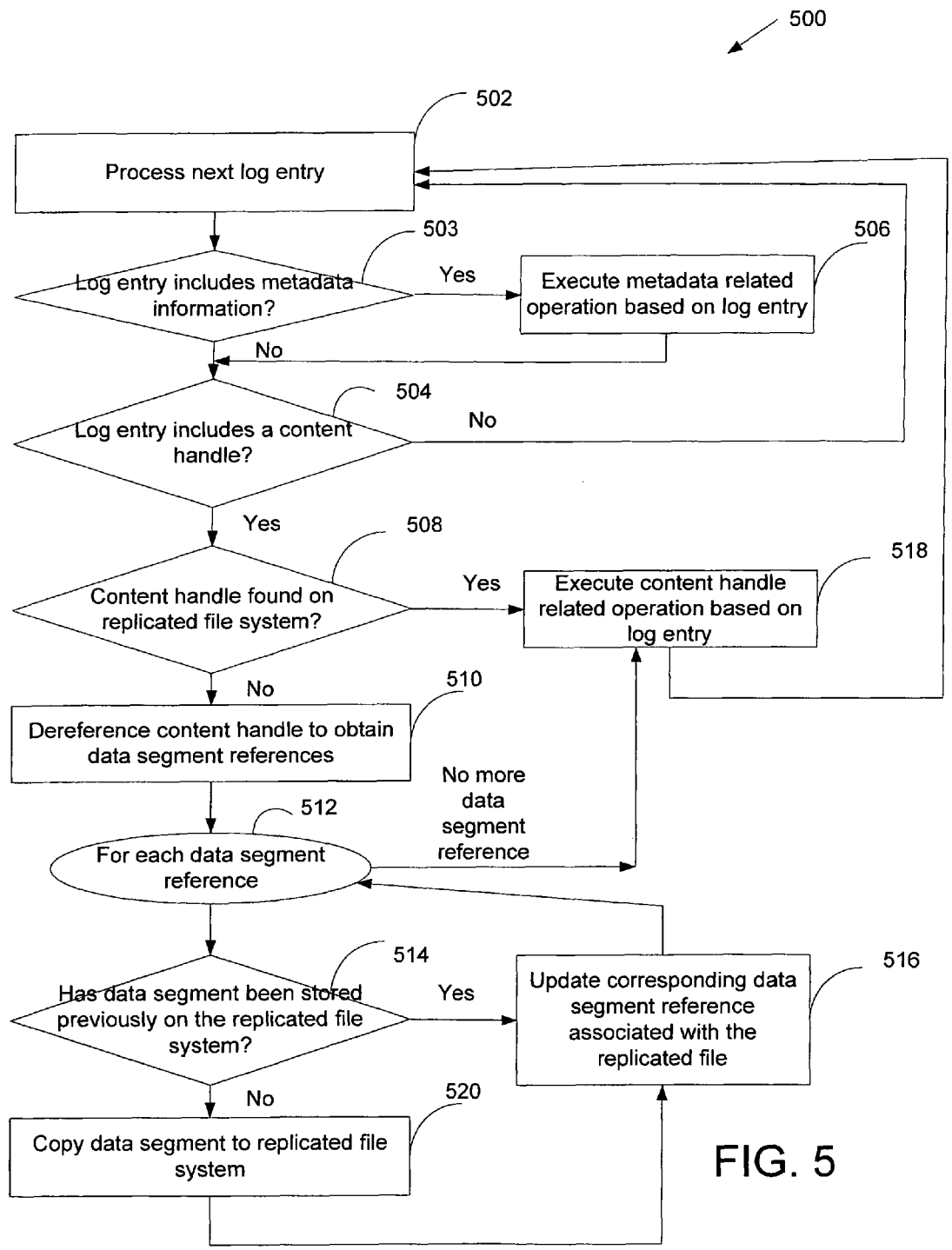
FIG. 5 is a flowchart illustrating an embodiment of a file replication process using log records.

FIG. 5 is a flowchart illustrating an embodiment of a file replication process using log records. Process 500 may be implemented on replicator 110. In this example, the process starts during a replication process. Each log entry in the log is processed (502). It is determined whether the log entry includes metadata information (503). If so, based on the log entry, one or more operations relating to the metadata are executed on the replicated file system (506). For example, if the metadata in the log entry indicates that there has been a permission change or a name change to a file on the original file system, the same operation is performed on the replicated file system. After executing the metadata related operation (506), or if there is no metadata included in the log entry (503), it is determined whether the log entry includes a content handle since content handles require special processing in this example (504). If no content handle is included in the log entry, the next log entry is processed (502). If, however, there is a content handle included in the log entry, it is optionally determined whether the content handle is found on the replicated file system (508). If the content handle is found on the replicated file system, it suggests that all the data segments included in the corresponding file have already been stored on the replicated file system and no new data segment needs to be copied. Based on the log entry, any operation that is related to the content handle is executed on the replicated file system (518). For example, if the log entry indicates that a file with this content handle should be created, the operation is performed. The operation proceeds to process the next log entry in the record (502). If, however, the content handle is not found on the replicated file system, the content handle is dereferenced to obtain the collection of data segment references used to represent the updated file (510). Dereferencing the content handle involves parsing the content handle, following the multi-layered data structure used to construct the content handle as appropriate, and obtaining the ordered collection of data segment references that make up the file. For example, in FIG. 4A, to dereference content handle S, S is first analyzed to determine the intermediate references U, V, and W, and each of the intermediate references is in turn analyzed to determine the collection of data segment references A-O.

In some embodiments, the content handle on the replicated file system is likely different from the content handle on the original file system. For example, if the content handles are derived based on memory addresses in the system, content handles corresponding to the same file will likely have different values whether or not there has been changes to the file itself. Thus, 508 is omitted.

Returning to FIG. 5, for each data segment reference in the collection (512), it is determined whether the data segment has been stored previously on the replicated file system (514). In some embodiments, the determination is made by sending a query to the replicated file system, and receiving a response indicating whether the data segment can be found on the replicated file system. In some embodiments, the determination is made by comparing the data segment reference with the original file system's collection of data segment references both for this file and for other files at the last replication. For example, if another file that was previously replicated on the replicated file system has a reference to the same segment, the data segment would have been stored on the replicated file system already. If the data segment reference is not found based on what is known about previously replicated original file system, a query may be made to the replicated file system to confirm whether the data segment reference has been stored already. If it is determined that the data segment has been stored previously on the replicated file system, the corresponding data segment reference associated with the replicated file is updated (516). If the data segment has not been stored previously, it is copied to the replicated file system (520), and the corresponding data segment reference is updated (516). 512-520 repeat until there is no more data segment reference to be processed. Based on the log entry, any operation related to the content handle is executed on the replicated file system (518). Operation 500 may be repeated until all the log entries are processed.

In some embodiments, snapshots of the files are used for file replication. A snapshot of the file as it existed at the time of the previous replication is compared with a snapshot of the file at the time the next replication is carried out. The differences between the snapshots, if any, are used to locate new data segments. In some embodiments, the snapshots include content handles. For example, some embodiments track two content handles for each file for file replication purposes. One content handle, referred to as the previous content handle, is associated with the file as it was at an earlier time. The previous content handle may be viewed as a snapshot of the file at the earlier time. It is created when the file was last replicated and before any new modification to the file. The previous content handle is saved by the system for later use. The other content handle, referred to as the current content handle, is created before the next replication begins. The current content handle may be viewed as a snapshot of the file as it will be replicated in the current replication process. There are various ways to store the previous and current content handles. For example, one or both of the two content handles may be stored separately in two snapshots of the file system, in the log record, in the original and/or the replicated file system, or other appropriate locations.

Figure 6:
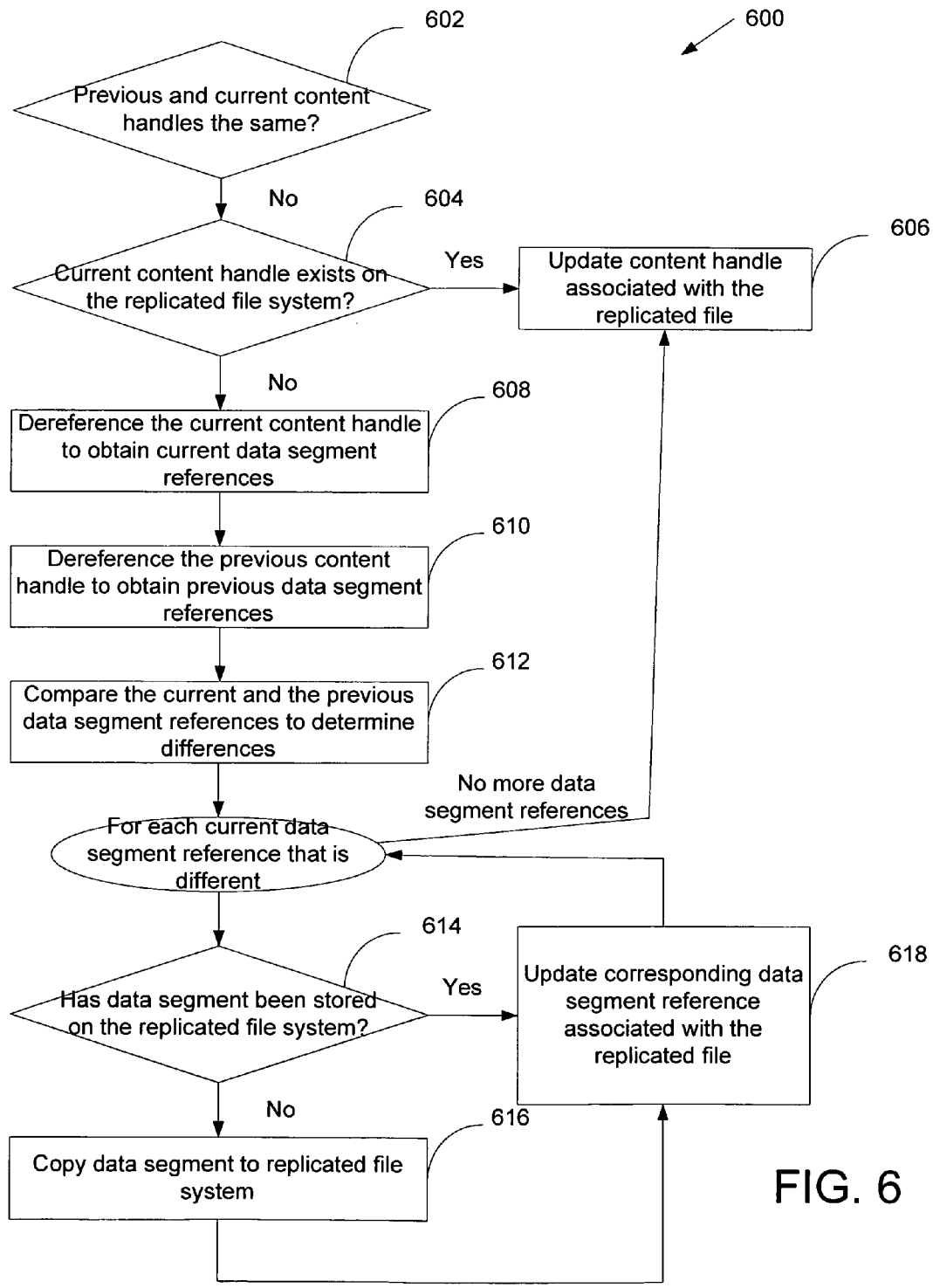
FIG. 6 is a flowchart illustrating an embodiment of a file replication process that uses two content handles.

FIG. 6 is a flowchart illustrating an embodiment of a file replication process that uses two content handles. Process 600 may be implemented on replicator 110. In the example shown, process 600 begins when the file is ready to be replicated. The previous content handle and the current content handle are compared to determine whether they are the same (602). If the content handles are the same, the file has not changed, therefore does not need to be updated on the replicated file system. If, however, the content handles are different, it suggests that the file has changed since the last replication. Optionally, it is further determined whether the current content handle exists on the replicated file system (604). In this example, the determination is done by sending the current content handle to the replicated file system, making a query regarding the current content handle, and examining the response received. If the content handle exists, it suggests that the contents of the file have already been stored on the replicated file system, and no new data segment needs to be copied. The content handle associated with the replicated file, the intermediate layer nodes, and the data segment references are optionally updated on the replicated file system if required by the implementation (606). If, however, the current content handle does not exist on the replicated file system, the current content handle is dereferenced to obtain a plurality of current data segment references (608) and the previous content handle is dereferenced to obtain a plurality of previous data segment references (610). The previous and the current data segment references are compared to determine their differences (612). The offsets of the changed data segment references are also determined as appropriate.

Each current data segment reference that is deemed to be different from the previous version is examined to determine whether the underlying data segment has been stored on the replicated file system (614). In some embodiments, this determination may include sending the data segment reference to the replicated file system, making a query regarding the data segment reference, and examining the response received. The replicated file system is configured to receive the query, look up the data segment reference in its database, and respond affirmatively if the data segment reference is in the database and negatively otherwise. In some embodiments, the determination may include checking data structures local to the originating file system to determine if the segments have already been stored on the replica file system. If the underlying data segment has not been stored already, it is copied to the replicated file system (616) and the corresponding data segment reference associated with the replicated file is updated (618). If, however, the underlying data segment has already been stored, it is not copied. The corresponding data segment reference associated with the replicated file is still updated (618). 614-618 are repeated for all the current data segment reference deemed different from the previous data segment reference. Once the data segment references are processed, the content handle and other metadata associated with the file are also updated on the replica (606).

Process 600 may be illustrated using the examples shown in FIGS. 4A-4B. Content handle S of FIG. 4A is the previous content handle taken after the last update, before any further modification has occurred to the file. Content handle T of FIG. 4B is the current content handle. A comparison of the two content handles shows that the file has changed since the content handles are different (602). Assuming that current content handle T does not already exist on the replicated file system, S and T are dereferenced to obtain an ordered collection of previous data segment references (A, B, C, D, E, F, G, H, I, J, K, L, M, N, O) and an ordered collection of current data segment references (A, B, C, P, E, F, Q, H, I, J, K, L, M, N, O) (604-610). A comparison of the two collections of data segment references indicates that data segment references D and G at offsets of 3 and 6 have changed to data segment references P and Q (612). For data segment references P and Q, it is determined whether their corresponding data segments have been stored on the replicated file system (614). As previously discussed, the determination can be made by querying the replicated file system, or by examining data segment references on the original file system that are known to have been replicated already. A new data segment is copied to the replicated file system, while as a previously stored data segment is not copied. The corresponding data segment references associated with the replicated file are updated (616-618).

In some embodiments, snapshots of content handles are incorporated into log records to replicate a file system. In other words, a process similar to 600 is sometimes combined with a process similar to 500. The operations to the original file system are recorded. In particular, when content handles associated with files are updated, such as when a file is closed, when a snapshot is taken, etc., both the old and the new content handles may be included in the log record. During replication, the log entries that do not include content handle information (e.g. log entries that only include metadata changes such as file permission change, file name change, etc.) are used to invoke the same operations on the replicated file system. Log entries that include content handle information are processed according to a routine similar to process 600.

In some embodiments, garbage collection is used to reclaim space occupied by objects (such as data segments) that are no longer used. The garbage collector finds the unused objects and deletes them from the system. In a traditional system, an object is deemed to be unused when it is not referenced by the file system. For example, a data segment J is initially referenced by a file A only once. Later, file A is modified and no longer makes reference to data segment J. Data segment J is now an unused object. Ordinarily, on a traditional system, data segment J would be a candidate for garbage collection, to be deleted when garbage collection is in progress. In some embodiments such as ones that use log records for data replication, however, data segment J should be kept alive until any log entry making a reference to data segment J, either directly or indirectly, is processed. A log entry may directly reference data segment J by including its data segment reference in the entry, or indirectly reference J by including the content handle of file A.

Several techniques are used in various embodiments to prevent the data segment from being deleted by the garbage collector prematurely. A number of the techniques are detailed below, although other appropriate techniques may be employed. In some embodiments, the garbage collector determines whether an object should be deleted based on a reference count. A reference count of 0 indicates that the object is no longer in use and should be deleted. Thus, to prevent data segment J from being deleted prematurely during garbage collection, the reference count associated with the data segment is incremented at the time a log entry referencing the data segment is created. The reference count is decremented after the log entry is processed in a replication operation. Or, instead of decrementing the reference count when the file ceases referencing the object, the reference count is decremented when the log record referencing the object is processed. In either case, at least one reference to the data segment is maintained during garbage collection to indicate that the data segment is still in use.

In some embodiments, the garbage collector uses what is called a "mark and sweep" technique to determine the objects to be deleted. Using this technique, the garbage collector examines the objects, enumerates the references to each object, and selectively deletes the objects having no references. To prevent premature garbage collection, the garbage collector is modified to enumerate references made by log entries as well as references made by the file system, so that a data segment only referenced by the logs is still considered in use.

In some embodiments, the file system is modified such that a placeholder is created to maintain a reference to a data segment made by a log entry. This way, the data segment appears to be in use to the garbage collector until the log entry is processed and the placeholder deleted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of file system replication comprising:
   determining using a processor whether one of a plurality of files included in an original file system has been updated since a previous replication, including comparing a current content handle associated with the file at current time and a previous content handle associated with the file at an earlier time, wherein:
   each content handle is derived based at least in part on a multi-layered hierarchical representation of the file;
   the multi-layered hierarchical representation includes a bottom layer that includes a plurality of bottom layer nodes that corresponds to a plurality of data segments included in the file, and a second layer that includes a plurality of second layer nodes each being derived based at least in part on some of the bottom layer nodes;
   each content handle is derived based on one or more nodes in the hierarchical representation of the file that are included in a layer other than the bottom layer; and
   in the event that the file has been updated, locating among the plurality of data segments a previously not stored data segment; replicating the previously not stored data segment; and locating among the plurality of data segments a previously stored data segment that is newly referenced by the file, wherein locating the previously stored data segment is based at least in part on at least some of the plurality of data segment references, and the previously stored data segment is not replicated.

2. A method as recited in claim 1, wherein in the event that the file has been updated, the method further comprises updating metadata associated with the file on the replicated file system.

3. A method as recited in claim 1, wherein in the event that the file has been updated, the method further comprises determining an updated portion of metadata associated with the file, and replicating the updated portion of metadata on the replicated file system.

4. A method as recited in claim 1, wherein in the event that the file has been updated, the method further comprises replicating a data segment reference associated with the file on the replicated file system.

5. A method as recited in claim 4, wherein the data segment reference is determined based at least in part on a content handle associated with the file.

6. A method as recited in claim 1, wherein in the event that the file has been updated, the method further comprises determining a data segment reference that has been updated, and replicating the updated data segment reference.

7. A method as recited in claim 1, wherein determining whether the file has been updated includes processing a log record.

8. A method as recited in claim 1, wherein at least one of the previous content handle and the current content handle is stored in a log record.

9. A method as recited in claim 1, wherein at least one of the previous content handle and the current content handle is stored in a file system snapshot.

10. A method as recited in claim 1, wherein at least one of the previous content handle and the current content handle is stored in the original file system.

11. A method as recited in claim 1, wherein at least one of the previous content handle and the current content handle is stored in the replicated file system.

12. A method as recited in claim 1, wherein determining whether the file has been updated includes performing a file system walk.

13. A method as recited in claim 1, wherein determining whether the file has been updated includes comparing a plurality of snapshots.

14. A method as recited in claim 1, wherein determining whether the file has been updated includes comparing a plurality of snapshots of the original file system.

15. A method as recited in claim 1, wherein determining whether the file has been updated includes comparing a plurality of snapshots of the file.

16. A method as recited in claim 1, wherein locating the previously stored data segment includes looking up at least some of the plurality of data segment references on the replicated file system.

17. A method as recited in claim 1, wherein locating the previously stored data segment includes looking up at least some of the plurality of data segment references on the original file system.

18. A method as recited in claim 1, wherein locating the previously not replicated data segment is at least in part based on the current content handle associated with the file.

19. A method as recited in claim 18, wherein locating the previously not stored data segment based at least in part on the current content handle includes dereferencing the content handle to obtain a plurality of data segment references, and determining whether each of the plurality of data segment references corresponds to a stored data segment that has been previously stored on the replicated file system.

20. A method as recited in claim 18, wherein locating the previously not stored data segment is further based at least in part on the previous content handle.

21. A method as recited in claim 20, wherein locating the previously not stored data segment further includes:
dereferencing the current content handle to obtain a plurality of recent data segment references associated with the recent version of the file; and
dereferencing the previous content handles to obtain a plurality of previous data segment references associated with the earlier version of the file; and
determining a difference between the plurality of current data segment references and the plurality of previous data segment references.

22. A method as recited in claim 21, wherein locating the previously not stored data segment includes determining whether the previous content handle has been stored on the replicated file system.

23. A method as recited in claim 22, further comprising, in the event that the previous content handle has not been stored on the replicated file system, dereferencing the current content handle to obtain a plurality of recent data segment references associated with the current version of the file.

24. A method as recited in claim 1, further comprising:
prior to replicating the previously not stored data segment, preventing the previously not stored data segment from being deleted during garbage collection before the previously not stored data segment is replicated on the replicated file system.

25. A method as recited in claim 24, further comprising maintaining a log record that maintains a reference to the previously not stored data segment.

26. A method as recited in claim 24, further comprising keeping a reference count of the previously stored data segment to be greater than zero at least until the previously not stored data segment is replicated.

27. A method as recited in claim 24, further comprising creating a place holder in the original file system to maintain a reference to the previously not stored data segment.

28. A method as recited in claim 1, further comprising initializing the replicated file system by copying the original file system.

29. A method as recited in claim 1, further comprising initializing the replicated file system by copying data segments that are included in the original file system.

30. A file system replicator comprising:
a processor configured to:
determine whether one of a plurality of files included in an original file system has been updated since a previous replication, including comparing a current content handle associated with the file at current time and a previous content handle associated with the file at an earlier time, wherein:
each content handle is derived based at least in part on a multi-layered hierarchical representation of the file;
the multi-layered hierarchical representation includes a bottom layer that includes a plurality of bottom layer nodes that corresponds to a plurality of data segments included in the file, and a second layer that includes a plurality of second layer nodes each being derived based at least in part on some of the bottom layer nodes;
each content handle is derived based on one or more nodes in the hierarchical representation of the file that are included in a layer other than the bottom layer; and
in the event that the file has been updated, locate among the plurality of data segments a previously not stored data segment; replicate the previously not stored data segment; and locate among the plurality of data segments a previously stored data segment that is newly referenced by the file, wherein locating the previously stored data segment is based at least in part on at least some of the plurality of data segment references, and the previously stored data segment is not replicated; and
a memory coupled to the processor, configured to provide the processor with instructions.

31. A computer program product for file system replication, the computer program product being stored and/or recorded in a computer readable storage medium and comprising computer instructions for:
determining using a processor whether one of a plurality of files included in an original file system has been updated since a previous replication, including comparing a current content handle associated with the file at current time and a previous content handle associated with the file at an earlier time, wherein:

each content handle is derived based at least in part on a multi-layered hierarchical representation of the file;

the multi-layered hierarchical representation includes a bottom layer that includes a plurality of bottom layer nodes that corresponds to a plurality of data segments included in the file, and a second layer that includes a plurality of second layer nodes each being derived based at least in part on some of the bottom layer nodes;

each content handle is derived based on one or more nodes in the hierarchical representation of the file that are included in a layer other than the bottom layer; and in the event that the file has been updated, locating among the plurality of data segments a previously not stored data segment; replicating the previously not stored data segment; and locating among the plurality of data segments a previously stored data segment that is newly referenced by the file, wherein locating the previously stored data segment is based at least in part on at least some of the plurality of data segment references, and the previously stored data segment is not replicated.

* * * * *